United States Patent Office 3,574,859
Patented Apr. 13, 1971

3,574,859
PROCESS FOR THE TREATMENT OF HYPERTROPHIED GUMS
Carl M. Kosti, 704 Foxhall Road,
Bloomfield Hills, Mich. 48013
No Drawing. Continuation-in-part of application Ser. No. 742,535, July 5, 1968. This application June 2, 1969, Ser. No. 829,793
Int. Cl. A61k 5/00, 7/16, 27/00
U.S. Cl. 424—330                                 8 Claims

ABSTRACT OF THE DISCLOSURE

A process and composition for the treatment of hypertrophied and hyperplastic gums; alkaloids such as sympathomimetic amines which are vasoconstrictors, applied to the gums as a rinse or coating, for instance by an atomizer, by swabbing or through a toothpaste containing containing the same, for effective vasoconstriction of the gums.

---

The present application is a continuation-in-part of my copending application Ser. No. 742,535, filed July 5, 1968.

BACKGROUND OF THE INVENTION

The invention relates to a treatment for hypertophied and hyperplastic or overgrown gums and to compositions capable of depositing a sympathomimetic on the gums for effecting such treatment.

Hypertrophy of the gums sometimes called gingival hypertrophy, can be grouped into two causes; local or systemic. Local hypertrophy is a result of inflammation due to faulty dental restorations, ill fitting oral prosthesis or chronic irritation of the gums. Hypertrophy due to systemic causes is a result of organic disease such as: hypovitaminosis or hypervitaminosis (lack of or overabundance of certain vitamins), diabetes mellitus, heavy metal poisoning or from intake of medication to control some of the diseases such as epilepsy and like convulsions and post operative swelling. Of all the above causes epilepsy and like convulsions are most significant since medication must be prescribed to control them symptomatically, and the drugs most commonly used are: the hydantoin dirivatives (diphenylhydantoin and mesantoin), oxazolidine-2, 4-dione derivatives (trimethadione and paramethadione), phenylacetylureas (phenurone) and several other known agents. Of these drugs diphenylhydantoin (Dilantin Sodium) is the agent most commonly used anticonvulsant and one of its principal physical side effects produced by its use is hypertrophy or hyperplastic gums.

For many years an effective treatment has been sought without success for this condition. The gums, unless they have become fibrous, could conceivably be returned to their original condition or substantially so by stopping the intake of Diluantin Sodium or other hydantoin derivatives that had been prescribed. However this procedure is highly inadvisable since the possibility or convulsions is present. The only known treatment heretofore available has been surgical intervention. Pursuant to it the gums are cut away around the necks of the teeth and the cut surfaces are coated with a surgical paste to reduce pain and facilitate healing. Surgery is traumatic to the patient and is a long process and often painful.

SUMMARY OF THE INVENTION

The present invention overcomes the aforesaid problems and disadvantages. It provides a sure and safe effective treatment for hypertrophied and hyperplastic gums which have not become fibrous, substantially eliminating the need for surgery. In the case of epileptics it can utilized without interrupting the use of dilantin sodium or other hydantoin derivatives.

In obtaining the new and novel result the invention makes use of certain chemical compounds or substances which are sympathomimetics, which can be prepared in aqueous solutions and which possess among other properties those of serving as decongestants or vasoconstrictors effecting shrinkage of the overgrown gums. Certain alkaloids which are amines and which are also sympathomimetics are especially endowed with this property. Preferred are aromatic amines having a total of at least six carbon atoms and aliphatic amines having total of at least four carbon atoms. Aromatic amines having a total of between six to ten carbon atoms and aliphatic amines having a total of between four to seven carbon atoms are especially preferred since those aromatic compounds having above ten carbon atoms produce toxicity which is objectionable in most cases while aliphatic compounds having more than seven carbon atoms lose potency. Some examples of useful compounds are:

(A) Aromatic Nucleus
  (I) Unsubstituted:
    1. phenylethylamine: $C_6H_5.CH_2.CH_2NH_2$
    2. phenylethanolamine: $C_6H_5.CHOH.CH_2NH_2$
    3. amphetamine: $C_6H_5.CH_2.CHCH_3.NH_2$
    4. dextro-amphetamine: (isomer of amphetamine)
    5. methamphetamine: $C_6H_5.CH_2.CHCH_3.NHCH_3$
    6. mephentermine: $C_6H_5.CH_3CNCH_3H.CH_3$
    7. phenylpropanolamine: $C_6H_5.CHOH.CHCH_3.NH_2$
    8. ephedrine: $C_6H_5.CHOH.CHCH_3.NHCH_3$
    9. naphazoline: $C_{10}H_7.CH_2C-NH-CH_2$
                                    $\|\qquad\quad\;\,|$
                                    $N\!-\!\!-\!\!-\!\!-\!CH_2$
    10. phenylpropylmethylamine: $C_6H_5.CHCH_3.CH_2.NHCH_3$
  (II) Monosubstituted:
    1. tyramine: $HO.C_6H_4.CH_2.CH_2NH_2$
    2. 5-hydroxytryptamine:
    3. synephrine: $HO.C_6H_4.CHOH.CH_2.NHCH_3$
    4. phenylephrine: $C_6H_4OH.CHOH.CH_2.NHCH_3$
    5. hydroxyamphetamine: $HOC_6H_4CH_2.CHCH_3.NH_2$
    6. paredrinol: $HOC_6H_4CH_2.CHCH_3.NHCH_3$
    7. methoxyphenamine: $CH_3OC_6H_4CH_2.CHCH_3.NHCH_3$
  (III) Disubstituted:
    1. epinine: $(HO)_2C_6H_3CH_2.CH_2.NHCH_3$
    2. levarternol: $(HO)_2C_3CHOH.CH_2NH_2$
    3. epinephrine: $(HO)_2C_6H_3CHOH.CH_2.NHCH_3$
    4. methoxamine:
    5. oxymetazoline: (6-tert-butyl-3(2-imidazolin-2-ylmethyl)-2,4-dimethylphenol)
(B) Aliphatic nucleus
    1. tuamino heptane: $CH_3(CH_2)_4CHCH_3.NH_2$
    2. methylhexaneamine: $CH_3CH_2.CHCH_3.CH_2.CHCH_3.NH_2$ 3. cyclopentamine: [S ring]$>CH_2.CHCH_3.NHCH_3$ 4. propylhexedrine: [cyclohexane ring]$CH_2.CHCH_3.NHCH_3$ The above compounds are preferably used in their hydrochloride (liquid) or sulfate (solid) form in order to increase their solubility in water. The tartrate, phosphate and bromide forms while also useful have the objection of being too acid when dissolved in water. Some typical examples of all these forms are epinephrine bitartrate, ephedrine hydrochloride, ephedrine sulfate, propylhexedrine hydrochloride, methylhexaneamine hydrochloride, monobasic and dibasic amphetamine phosphate, amphetamine sulfate, phenylephrine hydrochloride, phenylephrine tartrate, cyclopentamine hydrochloride, oxymetazoline hydrochloride, and hydroxy amphetamine hydrobromide. Most of the above compounds are also soluble in alcohol and some, like ephedrine are soluble in oil.

The selected sympathomimetic may be applied to the gums in any known manner such as by a spray, mouth wash or rinse, swabbing with an applicator, by a tooth paste, or by a cream applied to the gums, in each case applying a coating containing one or more of the sympathomimetics to the gums. Such coatings may be prepared through the use of suitable vehicles such as oil, petrolatum, tooth paste bases such as phosphate products, water, and alcohol. In the mouth wash, rinse and spray forms the composition can be readily handled by the user with the assurance of complete gum treatment.

It has been found that solution concentrations of the sympathomimetic under about five percent will cover all applications and that concentrations of one-half two two percent when used as a mouth wash or rinse twice a day (more if needed) will provide effective treatment and extended action. Three percent can be used in a mouth wash depending upon the degree of the hypertrophy. Where quick shrinkage is not required, a concentration of .025 to 0.5% depending on the agent used is found to give prolonged effects. After a topical application during which the absorption of the drug occurs the onset of vasoconstriction (shrinkage) is rapid for a few seconds to a minute and maintained. Since the sympathomimetic is highly diluted and topically used, the possibility of side effects from or even if the user should accidentally swallow some or all of the applied material, are nil.

In the swabbing form of application wherein the gums are swabbed with an applicator, the sympathomimetic solution or drug is preferably contained in a sponge or foam plastic tip located at the end of a thin wood or plastic handle. Such a structure can conveniently be completely sealed until use in a plastic film bag to prevent loss of the solution either by evaporation or drainage. Before application the patient tears the plastic bag at the proper end, wipes his gums with any clean cotton or cloth and swabs the sponge end containing the solution around the entire surface of the gums where there is cinical demonstration of swelling or redness. Drying of the gums as indicated before application of the sympathomimetic composition renders the gums more hydrophillic such that the applied solution is more rapidly absorbed. This type of treatment will generally be repeated three to four times a day until the gums return to their normal condition. The advantage of this method of application is that it permits control of the drug to a precise amount while maintaining perfect sterility of the drug. Each applicator may be made to contain exactly one (1) cc. of the drug. There is no danger of any systemic side effects from swallowing of the drug accidently.

Instead of using individual applicators as described above the sympathomimetic solution may be contained air sealed in a plastic or glass bottle provided with an external sponge tipped plunger operable in the bottle by pump or vacuum principle such that each time the tip is pushed down into the bottle and withdrawn exactly one (1) milliliter of the solution escapes from the bottle to the absorbent tip. The applicator will generally be covered over the bottle with an air tight plastic hood.

The relative potency and systemic action of some of the above mentioned topically acting sympathiomimetic amines may be noted from the following table.

| Drug | Central nervous stimulation | Bronchial action | Cardiac stimulation | Recommended concentration, Percent by vol. |
|---|---|---|---|---|
| Levarterenol | Minimal | Weak | Strong | 0.1 |
| Epinephrine | Very Little | Very strong | do | 0.1 |
| Phenylephrine | Weak | Very weak | Peripheral [1] | 0.25–0.5 |
| Naphazoline | None | Weak | do | 0.1–0.05 |
| Ephedrine | Strong | do | Strong | 0.5–2.0 |
| Mephentermine | Very weak | Very weak or none | Peripheral | 0.5 |
| Cyclopentamine | Very little | Very weak | do | 0.5–1.0 |
| Tuaminoheptane | None | do | Very weak [2] | 1.0–2.0 |
| Phenylpropanolamine | Good | Weak | Strong | 1.0 |
| Hydroxyamphetamine | Little or none | None | do | 1.0 |
| Amphetamine | Very strong | Weak | Weak | 1.0 |
| Phenylpropylmethylamine | Very weak | Very weak | Very weak | 2.8 |
| Methylhexaneamine | None | Very weak or none | Very weak or none | 1.0–2.0 |
| Propylhexedrine | do | do | do | 1.0–2.0 |
| Oxymetazoline | Little or none | None | None | .05 |

[1] Dilation of the capillaries only, no cardiac stimulation.
[2] Very slight cardiac stimulation.

Ephedrine sulfate, phenylephrine hydrochloride, cyclopentamine hydrochloride, methylhexaneamine hydrochloride, propylhexedrine hydrochloride and oxymetazoline hydrochloride, are the preferred sympathomimetics because they can be employed in aqueous, oil, and alcohol solutions and in mixtures thereof. They are readily available, relatively stable, do not decompose upon exposure to light, heat, or air. They can be boiled for sterilization, have a long duration of action and are substantially free of after congestion. Ephedrine sulfate is readily available as a powder and can quickly be made into an aqueous solution of desired concentration. A two percent solution will provide quick shrinkage (a few seconds to a minute) and a one-half percent solution is recommended for prolonged use. Phenylephrine hydrochloride is a preferred specific compound because it has one of the shortest onset periods to effect shrinkage of the gums and is long in duration. There is very little central nervous system stimulation upon ingestion of the compound and there is almost no after congestion. It is readily available in solutions of desired concentration. A one to two percent solution will provide quick shrinkage (a few seconds to a minute) and a 0.25 to 0.5 percent solution is recommended for prolonged use.

Propylhexedrine hydrochloride is an alicyclic aliphatic sympathomimetic amine developed as a substitute for amphetamine. It is a volatile compound which is extremely active and a potent local vasoconstrictor which has very little central excitatory action and no after congestion. The compound is extremely active when used on dry oral mucous membrane and because of its volatility it must be air tight sealed before use.

Oxymetazoline hydrochloride has a gentle, predictable action, and prolonged persistent effect so that infrequent application is required. It has a virtual absence of rebound congestion and acquired tolerance, and minimal side effects. It has a broader profile of activity and a higher therapeutic index than most other sympathomimetics used as topical decongestants. It is more potent, longer acting, and better tolerated. It exerts the greatest pharmacologic activity and low concentrations (1:2000) produce the desired therapeutic effects. For prolonged use concentrations of (1:2000) or 0.05 percent of the solution is sufficient applied twice daily. When employed for rapid decongestion of the oral mucous membrane a higher concentration, up to 2.5 percent or even higher is preferably used. Side effects, if any, are transitory and mild as are those of most other agents described above.

Advantageously the sympathomimetics may be combined with other substances or compounds to render the drugs more effective and more palatable.

Thus it is desirable to include in the sympathiomemetic drug composition in amount up to 0.2 percent by weight of the composition a spreading factor or ingredient for example selected from certain enzymes and mixtures thereof of which hyaluronidase, and plant proteases, such as ananase are examples. Hyaluronidase, which is a proteolytic enzyme is quite effective and preferred. These substances especially the latter when applied to the gums dissolves the mucous protein material found on the surface thus exposing the underlying membrane to thereby provide a greater area of penetration for the sympathomimetic drug and a much shorter onset time for absorption thereof. However they facilitate the use of a lower concentration of the sympathomimetic drugs. Reductions for example from two percent to 0.2 percent with comparable results have been possible.

It is also advantageous to maintain the oral cavity at a pH between 5.4 to 7.0 preferably 6.8 to 7.4 during the application of the sympathiomimetic. Such is possible for example by combining with the drug certain pH control agents such as sodium chloride rendering the drug less irritating to the mucous membrane. This is particularly the case where the phosphate and tartrate forms of the drugs are employed. In general the inclusion of about .0045 gm. of pH control agent in each cc. of solution will produce the desired pH condition. In come cases certain of the above sympathiomimetics are obtainable as prepared solutions NF (national formulary) containing the control agent. Ephedrine sulfate is an example. It is obtainable as a three percent concentration by volume in a 0.36 percent aqueous isotonic sodium chloride solution which can be further diluted to a one half to two percent concentration with additional isotonic sodium chloride solution or water.

A further advantageous addition to the sympathiomimetic is a preservative compound to inhibit oxidation of the said alkaloid. Examples are methylparaben (0.1%), sodium benzoate (0.1%), sodium thiosulfate (0.02%), sodium bisulfite (0.02%) and chlorobutanol (0.5%). These are preferably used in concentrations noted.

Some of the sympathiomimetics will produce solutions having a bitter taste. In order to improve their palatability, natural or artifical sweeteners may be employed. The most potent drug disguising sweeteners are the essential oils such as peppermint and spearmint; menthol and thymol from which aromatic waters are obtained; saccharines such as sodium saccharine; methyl salycilate; syrups such as cacao and raspberry. The amount of sweetener to use will depend upon the taste desired and the specific sweetener employed. A few drops to a concentration of 0.2 percent will be found adequate. Where the sweetener is in the form of an aqueous solution such as peppermint water up to equal parts of the sweetener and the sympathiomimetic solution for example, may be used.

The following examples are provided to illustrate the invention as employed as a mouth wash, rinse, or spray.

Example I

An aqueous solution was prepared having the following composition in parts by weight

| | Grams |
|---|---|
| Ephedrine sulfate powder (pure) | 10.0 |
| Saccharine sodium (3 grains) | 0.2 |
| Spearmint oil (12 drops) | 1.0 |
| Distilled water (32 fluid oz.) | 995.0 |

The ingredients were mixed together until the powders were completely dissolved in the water. Alternatively the powders could be separately dissolved in the water and brought together and the spearmint oil then added and thoroughly dispersed. The above formula will produce a one percent concentration of ephedrine sulfate.

A solution prepared as in Example I was used to treat an epileptic who had undergone dilantin sodium (diphenylhydantoin) therapy for seven years and whose gums were red and engorged (puffed). The treatment was effected by having the patient swish a quantity of the solution (15–25 ml.) in his mouth and holding it there for from two to four minutes before emptying his mouth to thereby obtain maximum absorption of the drug into the gums. The treatment was carried out by the patient two to four times a day for successive days with the gums being visually examined following the first day and every day thereafter. After five days of use a substantial reduction in swelling and redness was clearly observed and the patient reported that the oral cavity was vastly improved in comfort. Before treatment the patient had experienced difficulty in brushing his teeth due to profuse bleeding of the gums, and pain. After treatment no bleeding resulted and the patient was able to brush his teeth without experiencing bleeding or pain.

Example II

A solution was prepared as in Example I with the addition of the following ingredients

| | |
|---|---|
| Sodium bisulfite (0.002 gram/cc.) gm | 1.92 |
| Sodium chloride (0.0045 gram/cc.) gm | 4.32 |
| Hyaluronidase—150 U.S.P. units/25–50 cc. of solution | |

Example III

An aqueous solution was prepared having the following composition in parts by weight

| | Grams |
|---|---|
| Phenylephrine hydrochloride solution (1.0 percent) | 100.0 |
| Saccharine sodium (¼ grain) | 0.018 |
| Sodium bisulfate (0.002 gram/cc.) | 0.2 |
| Spearmint oil (2 drops) | 0.072 |
| Sodium chloride (0.0045 gram/cc.) | 0.45 |

Example IV

An aqueous solution was prepared having the following composition in parts by weight

| | Gram |
|---|---|
| Phenylephrine hydrochloride solution (1.0 percent) | 1.0 |
| Distilled water (1 ml.) | 1.0 |
| Sodium chloride (0.0045 gram/ml.) | 0.0045 |
| Sodium lauryl sulfate (0.30 gram/1 fl. oz.) | 0.009 |
| Sodium bisulfite (0.002 gram/ml.) | 0.002 |
| Saccharine sodium (¼ grain/100 ml.) | 0.00018 |
| Spearmint oil (2 drops/100 ml.) | 0.00072 |

The above ingredients were mixed as in Example I. This composition was then used to saturate sponge tips of the above described applicators with exactly one (1) ml. of the solution and instantly sealing the unit in a plastic bag so that there was no escape of the drug. This step is important where a volatile component is present, as in Example V. Some of the solution was also bottled in a pump type bottle as described above equipped with a sponge tip. The solution may also be used in any of the other described ways.

Example V

An aqueous solution was prepared using the ingredients and amounts thereof as in Example IV but substituting for the phenylephrine hydrochloride solution 1 gram of propylhexedrine hydrochloride solution. This composition is readily employed in connection with sponge applicators and may be employed in any of the other described ways. It must be air tight sealed before use to inhibit evaporation of some of the sympathomimetic component.

Example VI

An aqueous solution was prepared using the ingredients and amounts thereof as in Example IV but substituting for the phenylephrine hydrochloride solution one gram of methylhexaneamine chloride solution. This composition may be used in any of the described ways.

Example VII

An aqueous solution was prepared using the ingredients and amounts thereof as in Example IV but substituting for the phenylephrine hydrochloride solution one gram of oxymetazoline hydrochloride. This composition may be used in any of the described ways.

Example VIII

A tooth paste was prepared having the following composition in parts by weight.

|  | Grams |
| --- | --- |
| Phenylephrine hydrochloride solution (1.0 percent) | 32.6 |
| Glycerine U.S.P. (glycerol) | 1.0 |
| Propylene glycol U.S.P. | 18.0 |
| Methylparaben | 0.1 |
| Saccharin sodium solution (50%) | 0.1 |
| Peppermint oil | 0.3 |
| Mineral oil | 1.0 |
| Sodium lauryl sulfate | 2.5 |
| Dicalcium phosphate (in very fine powder form) | 54.0 |
| Sodium carboxymethylcellulose, U.S.P. 120H | 0.9 |
| Distilled water | 14.5 |

The above ingredients were thoroughly mixed together into a smooth paste. Sodium carboxymethylcellulose is used as an emulsifier and a thickening and suspending agent. The glycerin and propylene glycol are employed to maintain the consistency of the paste and as diluents and binders. The sodium lauryl sulfate is a detergent and its aqueous solutions foam when agitated. The dicalcium phosphate is a very fine abrasive not injurious to the mucous membrane. The methylparaben is a preservative employed to prevent oxidation of the sympathomimetic agent. Other preservatives described above which may be used in lieu of methylparaben in this example and their concentrations are:

|  | Percent |
| --- | --- |
| Sodium benzoate U.S.P. | 0.1 |
| Sodium thiosulfate U.S.P. | 0.02 |
| Sodium bisulfite U.S.P. | 0.02 |
| Chlorobutanol U.S.P. | 0.5 |

In the above Example VIII the sympathomimetic agent is amalgamated into the tooth paste composition and such a composition can be used by the patient instead of the customary tooth paste. The advantage of this method of using the sympathomimetic agent is that it provides a controlled amount of the agent that the patient uses at one given time. Moreover, it uses an already established habit of most people with regard to oral hygiene and enables the patient to derive the benefit of the vasoconstrictor simultaneously with brushing and without altering his normal pattern. Gentle brushing of the teeth will at the same time massage the gums thereby increasing the circulation of the peripheral capillary bed and facilitating a more rapid absorption of the sympathomimetic agent. The result is greater vasoconstriction of the swollen gums.

It will be understood that one or more of the previously described addition agents may be employed in the above examples in the amounts recommended, in addition to those utilized therein, for the advantages obtainable thereby; also that one or more of the addition agents used in the examples may be omitted while sacrificing their advantages. Moreover, the concentrations of the sympathomimetics in Examples I to VIII may be varied in accordance with the recommendations previously described. Furthermore other formulations not necessarily preferred and with or without one or more of the addition agents may be prepared using in place of the sympathomimetic agents in Examples I to VIII any of the other sympathomimetic agents described above. The concentrations for them will become readily determined from the guide lines given for each of them or by a few trials using the concentrations employed in the examples as guides.

From the foregoing description of the invention it will be evident that a novel and effective treatment has been provided for hypertrophied and hyperplastic or overgrown gums. The treatment is simple and direct. It can be carried out by the patient and is harmless to use. Although the invention has specific application for epileptic patients who are in prolonged therapy of diphenylhydantoin (dilantin sodium) it will be apparent that the compositions and treatment described above will have other applications and uses which will suggest themselves to those skilled in the art. For example, the compositions may be used for treating any swelling due to local irritations or oral manifestations of systemic diseases, such as diabetes mellitus, post-operative swelling or chronic or acute gingevitis. Hence all modifications and equivalents coming within the spirit and intent of the invention are contemplated. Moreover it is significant that although some of the sympathomimetic agents have long been used in the treatment of sinus congestions and colds, their use as here, as an oral application for shrinking the gums has never suggested itself. Possibly this is because there is a vast difference in the applications. The lining of the nose is thin and repeated use of sympathomimetics has a toxic effect in such applications. On the other hand the gums are protected by secretions or mucous and there is no toxic effect. Regardless of the reason the fact remains that prior to the present invention the use of sympathomimetics as here described has never presented itself.

I claim:

1. A treatment for hypertrophied or hyperplastic oral tissue which comprises contacting said tissue and absorbing therein an alkaloid selected from the group consisting of aromatic amines having between about 6 to 10 carbon atoms and aliphatic amines having between about 4 to 7 carbon atoms, said contacting of the tissue being effected by rinsing said tissue with a composition containing from about 0.025 to 5.0 percent by weight of the composition of said alkaloid.

2. A treatment as set forth in claim 1 wherein said alkaloid is selected from the group consisting of ephedrine sulfate, phenylephrine hydrochloride, cyclopentamine hydrochloride, methylhexaneamine hydrochloride, propylhexedrine hydrochloride, oxymetazoline hydrochloride and mixtures thereof.

3. A treatment as set forth in claim 1 wherein said alkaloid is phenylephrine.

4. A treatment as set forth in claim 1 wherein said contacting is effected by spraying the tissue with said composition.

5. A treatment as set forth in claim 1 wherein said contacting is effected by swabbing the tissue with said composition.

6. A treatment as set forth in claim 1 wherein said contacting is effected by brushing the tisue with said composition.

7. A treatment for oral tissue which is hypertrophied or hyperplastic due to the presence in the tissue of a drug which causes the fibrils of the gum tissue to proliferate and form a fibrous network, said treatment comprising facilitating removal of said drug through the venous circulation system by absorbing in said tissue an alkaloid selected from the group consisting of aromatic amines having between about 6 to 10 carbon atoms and aliphatic amines having between about 4 to 7 carbon atoms, said absortion being effected by contacting said tissue with a composition containing from about 0.025 to 5.0 percent by weight of the composition of said alkaloid.

8. A treatment as set forth in claim 7 wherein said alkaloid is selected from the group consisting of ephedrine sulfate, phenylephrine hydrochloride, cyclopentamine hydrochloride, methylexaneamine hydrochloride, propylexedrine hydrochloride, oxymetazoline hydrochloride and mixture thereof.

References Cited

UNITED STATES PATENTS

| | | | |
|---|---|---|---|
| 1,890,860 | 12/1932 | Omohundro | 424—330 |
| 2,298,630 | 10/1942 | Shelton | 424—330 |
| 2,887,435 | 5/1959 | Witty et al. | 424—330 |
| 2,991,224 | 7/1961 | Bell | 424—330 |

OTHER REFERENCES

The Dispensatory of the United States of America, 25th ed., published by J. B. Lippincott Co., Philadelphia, 1955, pp. 84–87 and 500–512. Copy in POSL.

RICHARD L. HUFF, Primary Examiner

U.S. Cl. X.R.

424—54, 273